Nov. 20, 1923.

C. R. ROBINSON 1,474,565

MEANS FOR PRODUCING COMPOSITION ARTICLES

Filed June 6, 1921   3 Sheets-Sheet 1

INVENTOR
CLARENCE R. ROBINSON
BY
Mason Fenwick Lawrence,
ATTORNEYS.

Nov. 20, 1923.  
C. R. ROBINSON  
1,474,565  
MEANS FOR PRODUCING COMPOSITION ARTICLES  
Filed June 6, 1921    3 Sheets-Sheet 3

INVENTOR  
CLARENCE R. ROBINSON  
BY  
ATTORNEYS

Patented Nov. 20, 1923.

1,474,565

UNITED STATES PATENT OFFICE.

CLARENCE R. ROBINSON, OF BROOKLYN, NEW YORK.

MEANS FOR PRODUCING COMPOSITION ARTICLES.

Application filed June 6, 1921. Serial No. 475,532.

*To all whom it may concern:*

Be it known that I, CLARENCE R. ROBINSON, a citizen of the United States, residing at Brooklyn, in the county of Kings and State of New York, have invented certain new and useful Improvements in Means for Producing Composition Articles; and I do hereby declare the following to be a full, clear, and exact description of the invention, such as will enable others skilled in the art to which it appertains to make and use the same.

This invention has for its objects to provide means for producing composition articles from suitable raw materials in a continuous cycle of operations; to provide for rapidly handling the substance; to thus provide for rapid and economical production of articles; to avoid waste by reusing the products extracted from the substance as it passes through the cycle of operations; to secure simplicity of construction and operation, and to obtain other advantageous results that may be brought out in the following description.

Figure 1:
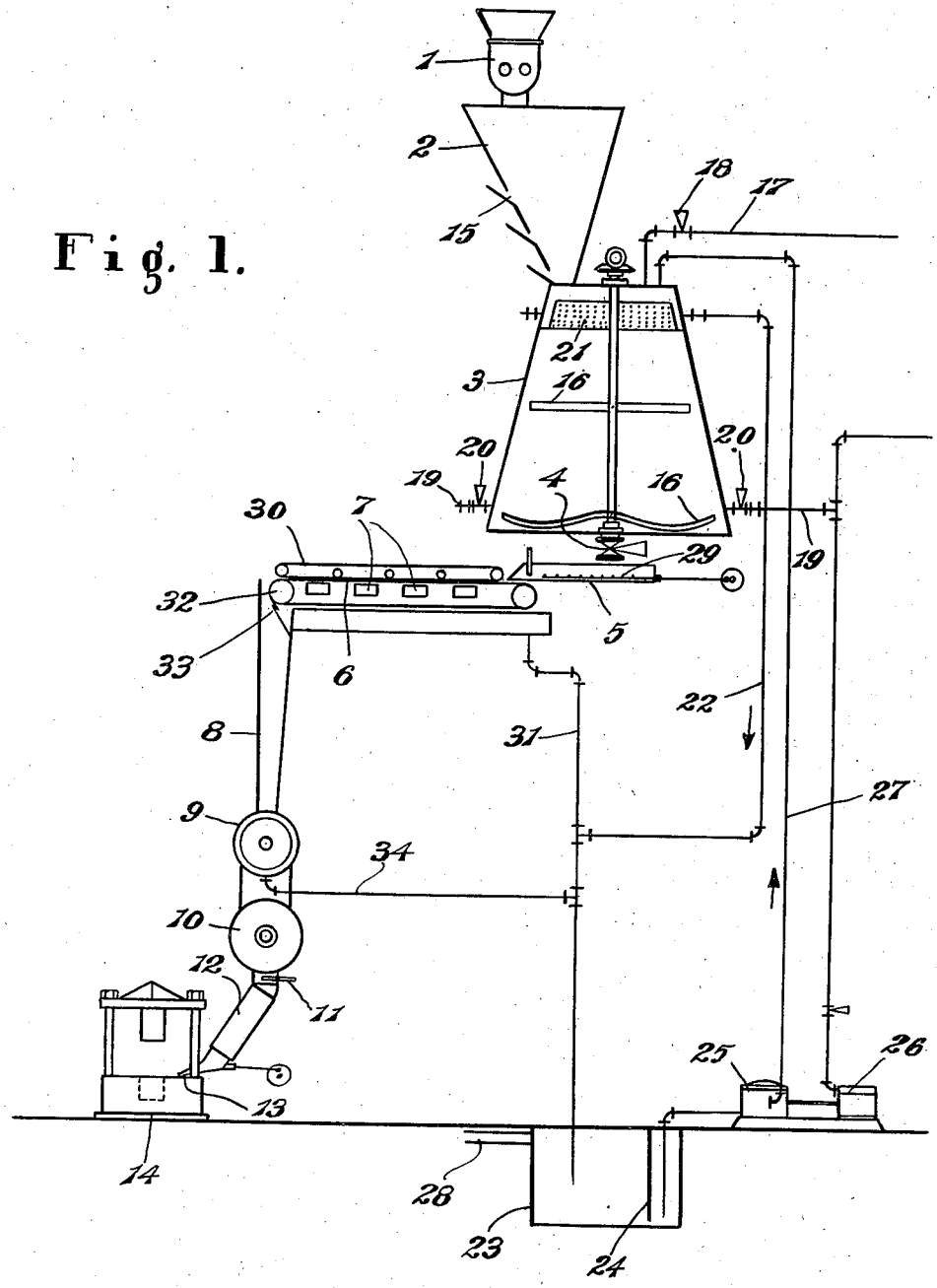
Figure 2:
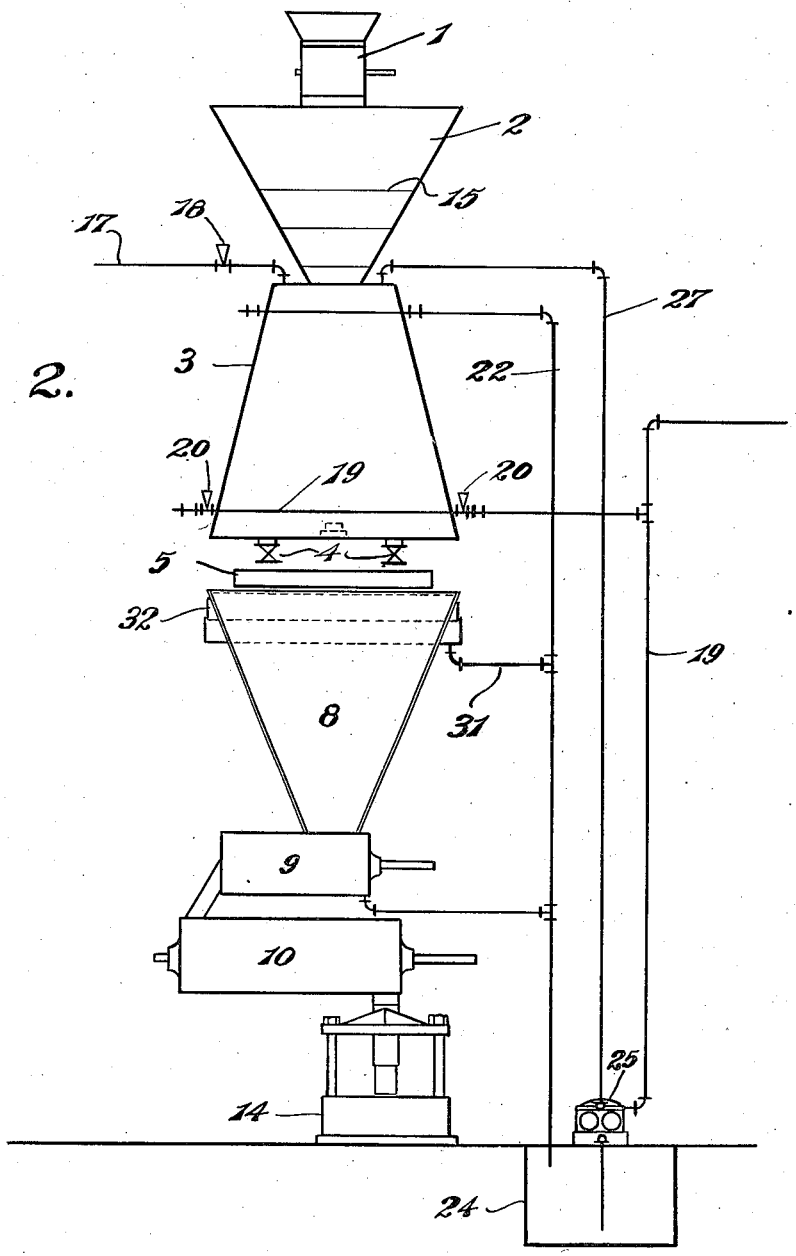
Figure 3:
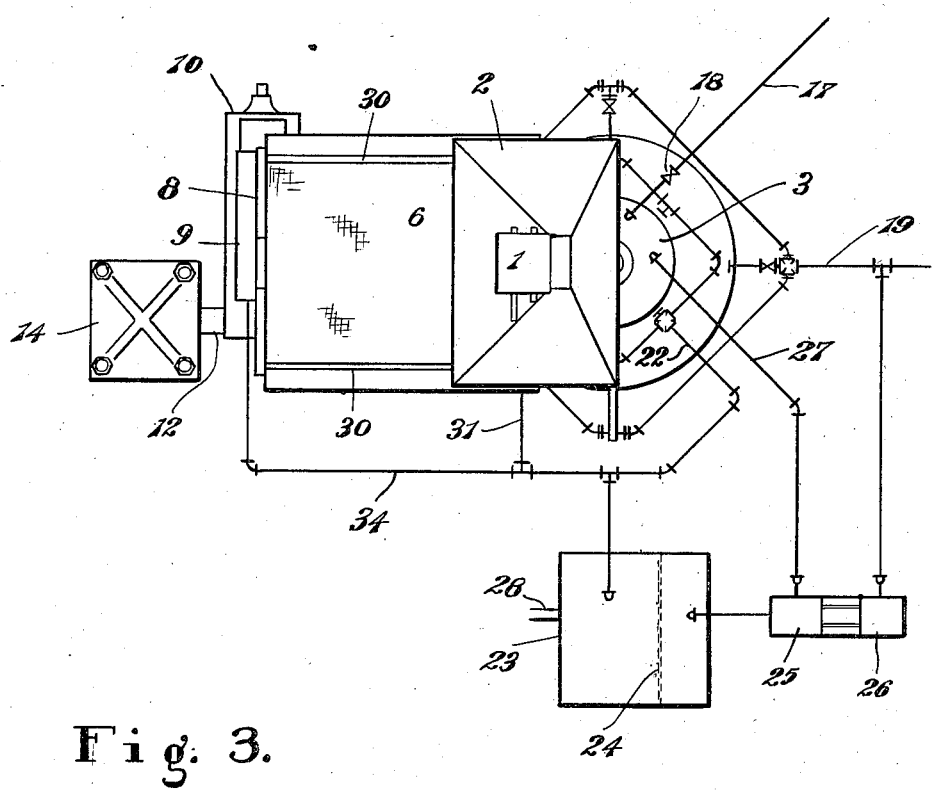

Referring to the accompanying drawings in which like numerals of reference indicate similar parts throughout the several views, Figure 1 is a side elevation, partly in section, diagrammatically showing the present invention, and Figures 2 and 3 are respectively a front elevation and a plan view diagrammatically showning the invention.

In the specific embodiment of the invention illustrated in said drawings, the reference numeral 1 indicates a cutting or chopping machine by means of which the substance such as paper, bark, cloth, or any other material to be used as the basis of the resulting composition may be cut, torn, broken or crushed into small particles from whence it drops into a hopper 2. From the hopper the material passes to a process tank in which, by means of chemicals, steam, or any other agencies, the particles are disintegrated for forming a mixture of a somewhat pasty nature. From the process tank the substance is drawn off through a gate valve 4 at the bottom of the tank to a sluice box 5 therebelow. The substance passes from the sluice box 5 to a traveling belt or screen 6 which passes over a plurality of suction boxes 7 by means of which the majority of the fluid contents of the substance is extracted and the resulting pulp then is dropped into a chute 8 the lower end of which is in communication with an expeller 9. This expeller 9 removes the desired amount of water contents remaining in the substance and passes the resulting pulp to a mixing cylinder 10. The pulp while in the cylinder 10 has the proper chemicals and other ingredients added thereto and thoroughly mixed so as to form a substantially homogeneous mixture. When the pulp has been thoroughly mixed a gate valve 11 at the bottom is opened permitting the substance to pass through into a sleeve or pipe 12 the nozzle 13 of which directs the substance into a press 14 wherein it is compressed and shaped, dried and chilled to form the desired article. It is not believed necessary herein to describe the particular article or articles which are to be made nor the exact construction of the press, inasmuch as these matters will be dealt with in another application. Suffice it to say that the press is of a construction in which the dies may be changed to produce any one of a great variety of articles such as boxes, furniture, shingles and building materials, toys, novelties and so on ad infinitum.

It is to be understood that this invention contemplates use of a great variety of raw materials, and I do not confine myself to any particular material forming the base of the substance nor to any particular chemicals or other ingredients used in the process. For such substances as require cutting such as paper, the device referred to above as the cutter 1, has a knife provided for the purpose, but for substances such as asbestos, the device referred to as cutter 1 would be provided with suitable shredder. Thus, for any material the cutter would be arranged to properly perform the function of reducing the raw material to small particles for introduction into the hopper 2. The hopper 2 is provided with suitable slots 15 in one wall thereof to enable the operator to assist the material to pass into the process tank should the materials become clogged in the hopper. The process tank 3 contains suitable vanes 16 or other agitating means actuated from a suitable source of power. Likewise the process tank has a water main 17 connected thereto by which a supply of water may be introduced into the tank as found necessary or desirable. The amount of water so introduced is controlled by the operator by means of a valve indicated at 18. The process tank is also connected by a pipe 19 with a suitable source of steam supply, and the operator may open valves 20 in these pipes 19 for admitting the requisite amount of steam for disintegrating the particles within the process tank.

When the proper disintegration has been obtained, the scum floating on the top of the mixture is drawn off through a filter 21 at the top of the process tank through a drain pipe 22 connected with a sump box 23. The liquids carried to the sump box 23 may be periodically drawn through a filter 24 by means of pipe 27 to the process tank 3. In this manner, all of the chemicals and water may be reused in the process tank. The sump tank 23 has a suitable sewer connection 28 for carrying off such of the matter returned to the sump tank as is not desired.

After the material has been suitably mixed and treated in the process tank the valve 4 is opened and the substance passes to the sluice box 5. I preferably provide an agitator 29 in the sluice box so as to assist the material to pass to the screen 6. Likewise, as indicated in the drawings, I provide traveling deckels 30 to form sides for the screen 6 and prevent the substance from spilling over the edge of the screen. The suction boxes 7 have vacuum applied thereto by any suitable means, and the liquid which is drawn from the substance by the suction boxes is carried back through pipe 31 to the sump box 23. As the traveling screen 6 passes over the roller 32, the substance or pulp drops into chute 8, a suitable scraper 33 being provided to remove such of the pulp from the screen which sticks thereto.

The expeller 9 may be of any suitable type adapted for the purpose, the specific construction of the same not being a feature of the present invention. A pipe 34 carries the extracted liquid from the expeller to the sump box and the material, when it has the proper consistency is permitted to pass to the mixing machine 10. The character of the chemicals, adhesive, and other substances introduced into the mixing machine 10 with the basic substance of pulp will have a direct influence upon the character of the resulting compound of the articles made therefrom.

The requisite characteristics of the resulting materials such as being fire-proof, water-proof, grease and oil-proof, may be obtained by the proper employment of chemicals, gums, oils, adhesives, starch, flour and so forth. The precise substances or proportions thereof do not constitute the present invention, and it is therefore not believed necessary to deal with this phase of the manufacture in any greater detail at this time. After the proper mixture has been obtained the mixture passes through gate valve 11 and sleeve 12 to the press. Preferably the sleeve 12 is automatically operated to withdraw the nozzle 13 from the press before the press operates upon the material. This therefore prevents any damage to the nozzle by actuation of the press.

Obviously detail changes and modifications may be made in the construction of the apparatus and carrying out the process, without departing from the spirit or scope of the invention, and I do not wish to be understood as limiting myself except as set forth in the following claims when construed in the light of the prior art.

Having thus described my invention, I claim.

1. In an apparatus for the production of composition articles, comprising a process tank, a sluice box for receiving the substance from the process tank, an agitator in said sluice box, and fluid removing means arranged and adapted to receive the substance from said sluice box and extracting fluid content therefrom.

2. In an apparatus for the production of composition articles, comprising a cutting device, a hopper for receiving the basic substance from said cutting device, a process tank for receiving said substance from the hopper and operating upon upon it to disintegrate the substance, a sluice box receiving the substance from the process tank, a section receiving the substance from said sluice box, means for removing fluid content from the substance, an expeller for removing additional fluid content from said substance, a mixing device wherein said substance may be mixed with characterizing ingredients, and means for forming the resultant mixture into the desired articles.

In testimony whereof I affix my signature.

CLARENCE R. ROBINSON.